United States Patent

Cunningham

[15] 3,693,221
[45] Sept. 26, 1972

[54] SAFETY SEAT BELTS FOR VEHICLES

[72] Inventor: Douglas J. Cunningham, Chichester, England

[73] Assignee: Wingard Limited, Chichester, Sussex, England

[22] Filed: Feb. 27, 1970

[21] Appl. No.: 14,916

[30] Foreign Application Priority Data

March 7, 1969 Great Britain..........12,084/69

[52] U.S. Cl. ............................................24/230 AU
[51] Int. Cl. ..............................................A44b 11/26
[58] Field of Search .....................24/230 AV, 230 A

[56] References Cited

UNITED STATES PATENTS

| | | | |
|---|---|---|---|
| 3,431,606 | 3/1969 | Jantzen | 24/230 A |
| 3,453,699 | 7/1969 | Smith | 24/230 A |
| 3,483,599 | 12/1969 | Fisher | 24/230 A |
| 3,494,007 | 2/1970 | Dahms | 24/230 A |
| 3,574,902 | 4/1971 | Lohr | 24/230 A |
| 1,063,716 | 6/1913 | McLaughlin | 24/230 AV |
| 3,147,996 | 9/1964 | Ferrara | 24/230 A X |
| 3,201,840 | 8/1965 | Jantzen | 24/230 AV |
| 3,522,636 | 8/1970 | Klink | 24/230 AV |

FOREIGN PATENTS OR APPLICATIONS

| | | | |
|---|---|---|---|
| 670,672 | 12/1929 | France | 24/230 A |
| 1,113,486 | 3/1956 | France | 24/230 AV |
| 211,590 | 7/1909 | Germany | 24/230 A |
| 1,122,920 | 8/1968 | Great Britain | 24/230 AV |

*Primary Examiner*—Bernard A. Gelak
*Attorney*—Scrivener, Parker, Scrivener & Clarke

[57] ABSTRACT

In a safety seat belt assembly for vehicles in which lap and diagonal straps are attached to one part of a two part separable buckle that part has a shank adapted to enter a socket in the second part which is secured to the floor of a vehicle and the second part incorporates a releasable spring-pressed latch co-operating with a shoulder on the shank on the first part when that is pushed home into the socket.

5 Claims, 5 Drawing Figures

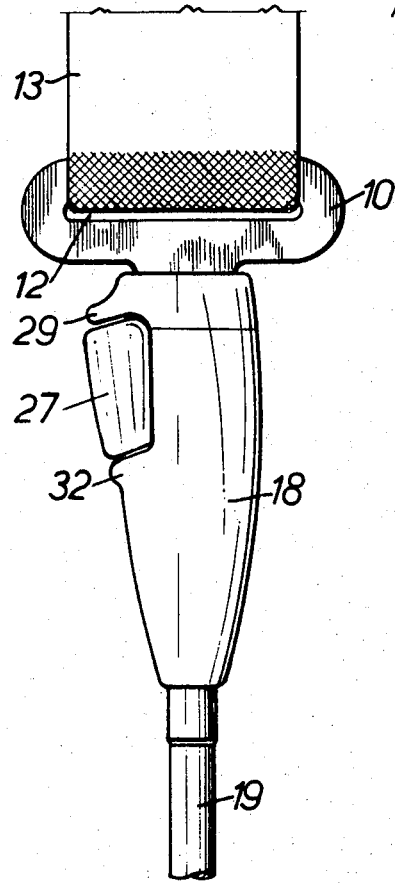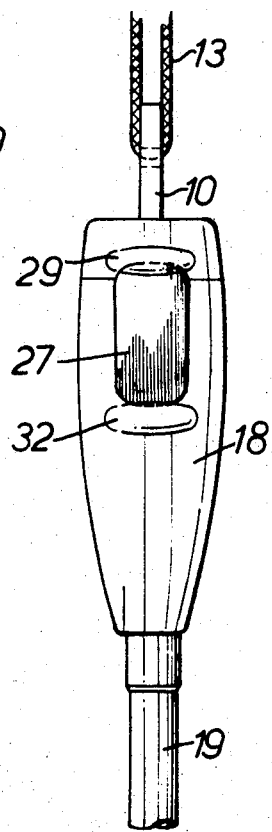

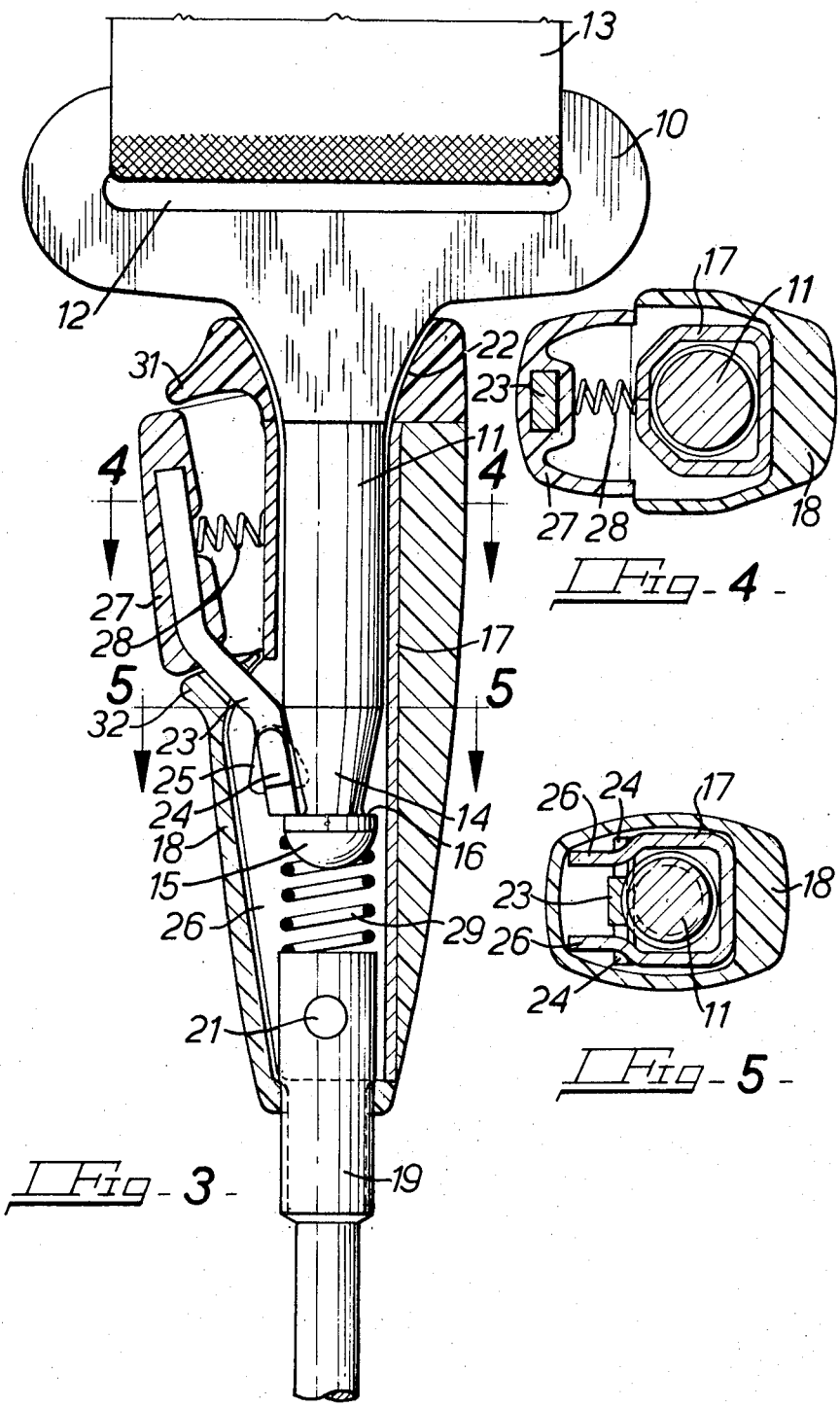

SAFETY SEAT BELTS FOR VEHICLES

This invention relates to improvements in safety seat belts for vehicles.

The most commonly used form of seat belt comprises a lap strap attached at one end to a floor anchorage and a diagonal shoulder strap attached at one end to an elevated anchorage on the body side or on a pillar. The other ends of the straps are attached to one part of a two-part separable buckle of which the second part is connected to or forms part of a rigid anchorage on the floor or on a shaft tunnel on the inner side of the seat. The lap and diagonal straps may be formed by a single length of webbing threaded through a slot in the first part of the buckle.

The second part of the buckle may itself be rigidly secured to the floor or shaft tunnel or it may be connected to an anchorage on the floor or shaft tunnel by a short strap or by a rigid or semi-rigid stem or arm. The use of a rigid or semi-rigid stem ensures that the second part of the buckle is located in a convenient position for the connection to it of the front part of the buckle when the lap and diagonal straps have been brought across the body of the wearer.

In a seat belt assembly according to our invention one part of a two-part buckle to which lap and diagonal belts are connected is formed with an elongated shank terminating in a tapered portion leading to a head provided with a radial shoulder or flange, and the second part, which is adapted to be attached to the floor or shaft tunnel of a vehicle, incorporates a socket in which the shank on the first part is received and a spring-pressed latch adapted to engage the shoulder or flange on the shank when it is pushed fully home in the socket.

Thus, in putting on the belt the wearer simply has to grasp the first part of the buckle with one hand and push it into the fixed second part.

A preferred form of buckle in accordance with our invention is illustrated by way of example in the accompanying drawings in which:

FIG. 1 is a front elevation of the complete buckle;
FIG. 2 is a side elevation;
FIG. 3 is a vertical section of the buckle with the two parts fully engaged; and
FIGS. 4 and 5 are transverse sections on the line 4—4 and 5—5 respectively of FIG. 3.

The first part of the buckle comprises a flat upper portion 10 and an integral shank 11. A slot 12 in the upper portion has threaded through it a strap 13 which forms the lap and diagonal parts of a safety belt. The shank is cylindrical over most of its length but terminates at its lower end in a tapered portion 14 leading to a head 15 providing a radial shoulder or flange 16 of substantial width.

The second part of the buckle comprises a steel or other metal sleeve 17 moulded into or otherwise rigidly fixed in a moulded plastic housing 18. The head of a bolt 19 by which the second part of the buckle is secured to the floor or shaft tunnel of a vehicle is received in the lower end of the sleeve in which it is rigidly fixed by a cross-pin 21 passing through the sleeve and bolt.

The shank 11 on the first part of the buckle is entered into the sleeve through the upper end of the housing which has a flared opening 22 to facilitate the entry of the shank.

When the shank is fully home in the sleeve it is held in that position by a spring-pressed latch member 23 of which the lower end is adapted to engage the radial shoulder or flange 16 on the shank. A short distance above its lower end the latch member is formed with opposed lugs 24 which are received in sector-shaped openings 25 in parallel laterally extending flanges 26 on the sleeve so that the latch member is mounted to rock through a limited angle relative to the sleeve. The upper part of the latch member is joggled outwardly and is moulded into a plastic finger-piece or hand grip 27 which is shaped to conform to the outer surface of the housing. The latch member is biassed into the engaged position shown in FIG. 3 by a spring 28 located between the finger-piece and the sleeve.

To engage the two parts of the buckle the shank on the front part is simply pushed into the second part until the head 16 passes the lower end of the latch member which snaps into engagement with the shoulder or flange 16.

Any pull tending to separate the two parts of the buckle is transmitted to the sleeve through the lugs 24 on the latch member engaging in the openings 25 in the sleeve, and the sleeve transmits the pull to the floor anchorage through the bolt 19.

To release the buckle the finger-piece is pressed inwardly to rock the latch member and disengage its lower end from the shoulder 16 on the shank 11.

A compression spring 29 is preferably located in the lower end of the sleeve between the head 15 of the shank 11 and the bolt 19 to initiate the upward movement of the shank out of the sleeve when the latch member is disengaged, the spring being compressed when the shank is pushed fully home.

Laterally projecting bosses 31, 32 may be formed on housing above and below the finger piece to protect the finger-piece from accidental damage and unintentional release.

In the embodiment illustrated the sleeve 17 is of C cross-section, but in a modification it may be of circular cross-section, an opening being cut in one side for the passage of the latch member.

Further, in the buckle illustrated the shank 11 on the first part of the buckle is cylindrical and is a sliding fit in the sleeve 17, but in modifications it may be of rectangular or polygonal cross-section and may not necessarily be a mating fit in the sleeve. Where the shank is not a mating fit in the sleeve the opening in the housing through which the shank is inserted into the sleeve may be of such a cross-section as to orient the shank correctly with respect to the sleeve and latch member.

I claim:

1. A safety seat belt assembly incorporating a two-part separable buckle of which the first part, to which lap and diagonal straps are adapted to be connected, has a readily releasable engagement with a second part which is adapted to be connected to a floor anchorage, the first part comprising a shank terminating in a tapered portion, a head of substantially the same cross-sectional dimensions as the shank at the end of the tapered portion providing a continuous circumferential shoulder facing in the direction of the shank, and the second part comprising a rigid sleeve having laterally extending parallel flanges, aligned openings in said flanges, an axial opening in said sleeve for receiving the shank, a latch member rockably mounted in said aligned openings and having a portion for engagement with said shoulder in the first part, said latch member extending from the engaging position within said sleeve to a position adjacent said axial opening, the portion adjacent the axial opening being outside of the sleeve for operating said latch member, and a spring biassing the latch member to the engaged position.

2. A safety seat belt assembly as in claim 1 wherein the headed shank is rotatable relative to the sleeve.

3. A safety seat belt assembly incorporating a two-part separable buckle of which the first part, to which lap and diagonal straps are adapted to be connected, has a readily releasable engagement with a second part which is adapted to be connected to a floor anchorage, the first part comprising a headed shank and a circumferential shoulder around said shank behind said head, and the second part comprising a rigid sleeve having laterally extending parallel flanges, said sleeve having an axial opening for receiving the shank, aligned sector-shaped opening in said flanges, an elongated latch member having an end portion adapted to engage the shoulder on said shank the latch member extending from said end portion in the direction of the axial sleeve opening, opposed lugs adjacent said end portion of the latch member and rockably mounted in said sector-shaped openings, the second end portion of the latch member being joggled outwardly relative to the sleeve to form a finger piece adjacent the axial sleeve opening for operating the latch member, and a spring acting between said sleeve and said second end portion to bias the latch into the engaged position.

4. A safety seat belt assembly as in claim 3 wherein a bolt is rigidly fixed to the sleeve, the bolt being adapted to secure the second part of the buckle to the anchorage.

5. A safety seat belt assembly incorporating two-part part separable buckle of which the first part, to which lap and diagonal straps are adapted to be connected, has a readily releasable engagement with a second part which is adapted to be connected to a floor anchorage, the first part comprising a headed shank and a circumferential shoulder behind said head, and the second part comprising a rigid sleeve having laterally extending parallel flanges, an axial opening at one end of said sleeve for receiving said headed shank, a bolt rigidly fixed to the other end of said sleeve, the bolt being adapted to secure the second part of the buckle to the anchorage, aligned openings in said flanges, and a spring-pressed latch member having opposed lugs rockably mounted in said aligned openings for bringing an end portion into engagement with said shoulder in the first part within said sleeve, said latch member extending from said end portion to a position adjacent said axial opening and outside of said sleeve for operating the latch member.

* * * * *

UNITED STATES PATENT OFFICE
CERTIFICATE OF CORRECTION

Patent No. 3,693,221          Dated September 26, 1972

Inventor(s) Douglas J. Cunningham

It is certified that error appears in the above-identified patent and that said Letters Patent are hereby corrected as shown below:

On the cover sheet, insert -- [73] Assignee  Wingard Limited, Chichester, Sussex, England -- .

Signed and sealed this 1st day of May 1973.

(SEAL)
Attest:

EDWARD M. FLETCHER, JR.            ROBERT GOTTSCHALK
Attesting Officer                  Commissioner of Patents